United States Patent
Nenov et al.

(10) Patent No.: US 7,330,938 B2
(45) Date of Patent: Feb. 12, 2008

(54) HYBRID-CACHE HAVING STATIC AND DYNAMIC PORTIONS

(75) Inventors: Iliyan N. Nenov, Rousse (BG);
Panayot M. Dobrikov, Plovdiv (BG)

(73) Assignee: SAP AG, Walldorf (DE)

( * ) Notice: Subject to any disclaimer, the term of this patent is extended or adjusted under 35 U.S.C. 154(b) by 261 days.

(21) Appl. No.: 10/849,354

(22) Filed: May 18, 2004

(65) Prior Publication Data

US 2005/0262306 A1    Nov. 24, 2005

(51) Int. Cl.
*G06F 12/02* (2006.01)
(52) U.S. Cl. .................. 711/135; 711/134; 711/133; 711/136; 711/172; 711/171
(58) Field of Classification Search ............. None
See application file for complete search history.

(56) References Cited

U.S. PATENT DOCUMENTS

| | | | | |
|---|---|---|---|---|
| 5,594,886 | A * | 1/1997 | Smith et al. | 711/136 |
| 5,860,081 | A * | 1/1999 | Herring et al. | 711/100 |
| 6,115,809 | A * | 9/2000 | Mattson et al. | 712/239 |
| 6,321,235 | B1 * | 11/2001 | Bird | 707/203 |
| 6,889,290 | B2 * | 5/2005 | Hong | 711/120 |
| 2003/0105936 | A1 * | 6/2003 | Stakutis et al. | 711/202 |
| 2003/0172145 | A1 * | 9/2003 | Nguyen | 709/223 |
| 2005/0091511 | A1 * | 4/2005 | Nave et al. | 713/185 |
| 2005/0235054 | A1 * | 10/2005 | Kadashevich | 709/223 |

OTHER PUBLICATIONS

Wang, Thomas, "Programming Caching Data Structure in Java," *HP DSPP*, May 2000. http://h21007.www2.hp.com/PrintableVersion/1,2921,,00.html?TARGET=%2Fdspp%2Ftech%2Ftech%5FTechDocumentDetailPage%5FIDX%2F1%2C1701%2C2144%2C00%2Ehtml, pp. 1-3 (Jan. 26, 2004).
"JCS-Java Caching System," http:// Jakarta.apache.org/turbine/jcs/index.html, p. 1 (Jan. 26, 2004).
"JCS-JCS and JCACHE," http://jakarta.apache.org/turbine/jcs/JCSandJCACHE.html, pp. 1-2 (Jan. 26, 2004).
"JCS-Using JCS: Some basics for the web," http://jakarta.apache.org/turbine/jcs/UsingJCSBasicWeb.html, p. 1 (Jan. 26, 2004).
"JCS-Configuring the Local Cache," http://jakarta.apache.org/turbine/jcs/LocalCacheConfig.html, pp. 1-2 (Jan. 26, 2004).
"JCS-Remote Auxiliary Cache Client/Server," http://jakarta.apache.org/turbine/jcs/RemoteAuxCache.html, p. 1 (Jan. 26, 2004).

(Continued)

*Primary Examiner*—B. James Peikari
(74) *Attorney, Agent, or Firm*—Blakely Sokoloff Taylor & Zafman, LLC

(57) ABSTRACT

System and method for a hybrid-cache. Data received from a data source is cached within a static cache as stable data. The static cache is a cache having a fixed size. Portions of the stable data within the static cache are evicted to a dynamic cache when the static cache becomes full. The dynamic cache is a cache having a dynamic size. The evicted portions of the stable cache are enrolled into the dynamic cache as soft data.

27 Claims, 8 Drawing Sheets

OTHER PUBLICATIONS

Purdy, Cameron, "JCACHE—Java Temporary Caching API," *Java Community Process*, http://web1.jcp.org/en/jsr/detail?id=107&showPrint, pp. 1-5 (Jan. 26, 2004).

Bortvedt, Jerry, "Functional Specification for Object Caching Service for Java (OCS4J), 2.0," *Java Community Process*, http://www.jcp.org/aboutJava/communityprocess/jsr/cacheFS.pdf, pp. 1-27.

Jelenkovic, Predrag, et al., "Least-Recently-Used Caching with Dependent Requests," *Technical Reports Archive*, Department of Electrical Engineering, Columbia Univeristy, New York, NY, Aug. 2002. http://www.ee.columbia.edu/tech_reports/EE2002-12-201.pdf, pp. 1-28.

Jelenkovic, Predrag, et al., "Least Recently Used Caching in the Presence of Statistical Locality," *6th INFORMS TELECOM*, Mar. 2002. http://www.informs.org/Conf/Telecom02/Abstracts/Radovanovic01333190109.pdf, pp. 1-2.

\* cited by examiner

HYBRID-CACHE HAVING STATIC AND DYNAMIC PORTIONS

TECHNICAL FIELD

This disclosure relates generally to caching data, and in particular, relates to a hybrid-cache including a fixed sized portion and a dynamically sized portion.

BACKGROUND INFORMATION

Caching data in memory is an efficient way to improve the performance of software. The impetus behind caching data is to increase the speed with which data may be accessed. In general, retrieving data directly from a data source may be a slow process due to transmission delays, bandwidth constraints, and computational time. The first time data is retrieved from the data source a copy of the data may be saved within a cache (e.g., buffer). Subsequent requests for the same data may be serviced using the copy of the data saved within the cache, as opposed to the original data at the data source. As such, retrieval delays for cached data may be markedly shorter when compared to retrieval delays for the original data.

In general, a cache is a buffer, smaller and faster than the original data source. Furthermore, a data consumer may be locally located to, or at least closer to, the cache than to the data source. For example, a Web Cache is a computer system in a network that keeps copies of the most-recently requested web pages in memory or on a disk in order to speed up retrieval for client computers coupled to the network.

Data caching is further performed by various operating systems ("OS") (e.g., Windows) and virtual machines (e.g., Java Virtual Machine). Data retrieved from a hard disk is often copied into system memory and cached there by the OS while it is maintained in the general memory pool (i.e., the heap). If the heap grows beyond the confines of the physical system memory, the OS must place parts of the data in virtual memory (e.g., on the hard disk) in order to continue runtime operation. "Swapping" data to the hard disk greatly slows down processing. As such, programmers of Windows based applications should take care to expressly de-allocate memory in order to release it for other applications. Programmers of Java based applications (e.g., applets and servlets) need not expressly de-allocate objects from memory, as Java performs an automatic garbage collection without programmer intervention.

To maximize the benefits of an automatic garbage collection and/or to minimize swapping, an effective cache is desirable. In general, the larger the cache the better. However, a cache is limited by the total amount of memory less the amount of the total memory that is allocated for other uses. The amount of the total memory need for other uses usually varies with time. During intensive processing periods, other uses may consume large portions of the total memory. During less intensive processing periods, less is consumed. Since fixed sized caches must be designed for the intensive processing periods, fixed size caches do not take full advantage of the available memory at all times.

SUMMARY OF INVENTION

A system and method for a hybrid-cache are described herein. Data received from a data source is cached into a hybrid-cache. The hybrid-cache includes a static cache having a fixed size and a dynamic cache having a dynamic size. The data received from the data source is cached into the static cache as stable data. Portions of the stable data within the static cache are evicted to the dynamic cache when the static cache becomes full. The evicted portions of the stable cache are enrolled into the dynamic cache as soft data.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for a hybrid-cache having a static portion and a dynamic portion are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "cache" is defined herein as a buffer used to speed up data retrieval. A cache may be established within volatile memory (e.g., random access memory) or within non-volatile memory (e.g., hard disk).

Figure 1:
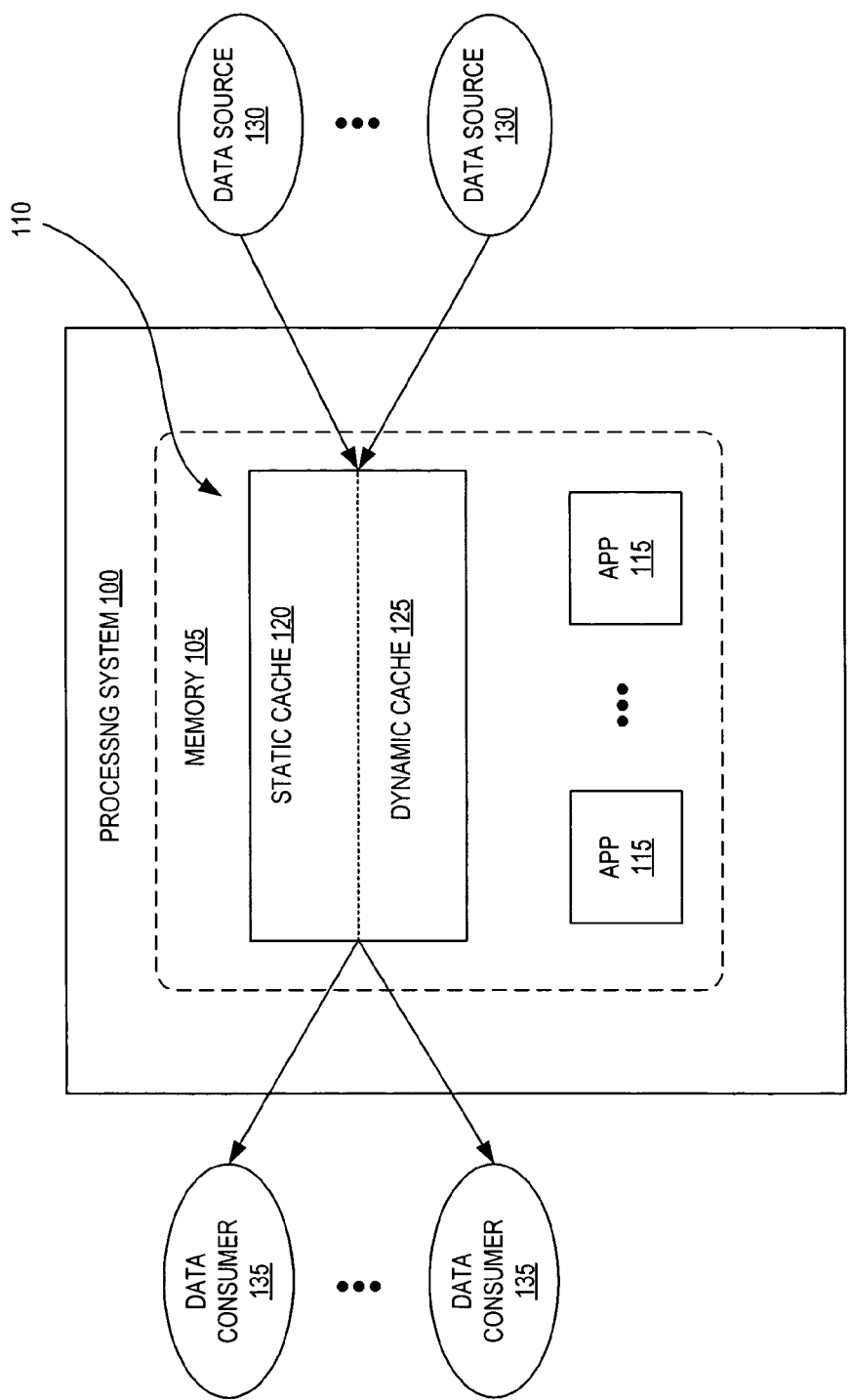
FIG. 1 is a block diagram illustrating a processing system including a hybrid-cache for buffering data received from data sources and for providing data consumers fast access to the data, in accordance with an embodiment of the present invention.

FIG. 1 is a block diagram illustrating a processing system 100 including a hybrid-cache, in accordance with an embodiment of the present invention. The illustrated embodiment of processing system 100 includes memory 105 holding a hybrid-cache 110, and one or more applications 115. Hybrid-cache 110 includes a static cache 120 and a dynamic cache 125.

Hybrid-cache 110 caches (i.e., buffers) data received from one or more data sources 130. In turn, hybrid-cache 110 may provide the cached data to data consumers 135 more quickly than if the data was directly obtained from data sources 130. As such, the more data buffered within hybrid-cache 110, the more likely requests for data issued by data consumers 135 may be quickly serviced from cached copies of the data within hybrid-cache 110, as opposed from data sources 130. Finding a match between a request for data and cached data is referred to as a "cache hit." The more likely a cache hit occurrence, the overall performance of processing system 100 is increased and data is provided to data consumers 135 in a more timely manner.

However, simply increasing a static size of hybrid-cache 110 is not an ideal solution, since memory 105 is finite and used for purposes other than just caching data. For example, applications 115 also consume memory 105 to operate. If all or a substantial portion of memory 105 is consumed by hybrid-cache 105 to the exclusion of applications 115, then applications 115 will run slow, or worse, a stack overrun error or insufficient memory error could occur.

Accordingly, embodiments of the present invention including static cache 120 having a fixed size and dynamic cache 125 having a dynamic size. Static cache 120 represents a guaranteed minimum size for hybrid-cache 110, while dynamic cache 125 may expand or contract depending upon the availability or scarcity of memory 105. The size of static cache 120 may be selected dependent upon the particular use, the overall size of memory 105, and the variety of other uses competing for memory 105 (e.g., applications 115). Dynamic cache 125 may contract to a zero size during intensive processing times of applications 115 or expand to many times larger than static cache 120 when applications 115 are idle and available memory 105 (e.g., unused memory) is abundant.

Memory 105 may be both volatile memory (e.g., random access memory) or non-volatile memory (e.g., hard disk). Applications 115 represent any other software entity competing for memory 105, including but not limited to, an operating system ("OS"), device drivers, applications, data, and the like. Data sources 130 represent any data source communicatively coupled to processing system 100 and may be internal or external to processing system 100. For example, data sources 130 may include hard drives, databases, servers, a network, the Internet, and the like. Similarly, data consumers 135 represent any entity consuming data from hybrid-cache 110 or data sources 130 and may be either internal or external to processing system 100. For example, data consumers 135 may include client computers of a network (e.g., local area network or wide area network) communicatively coupled to processing system 100, software entities executing on processing system 100, hardware entities of processing system 100, or the like.

Figure 2:
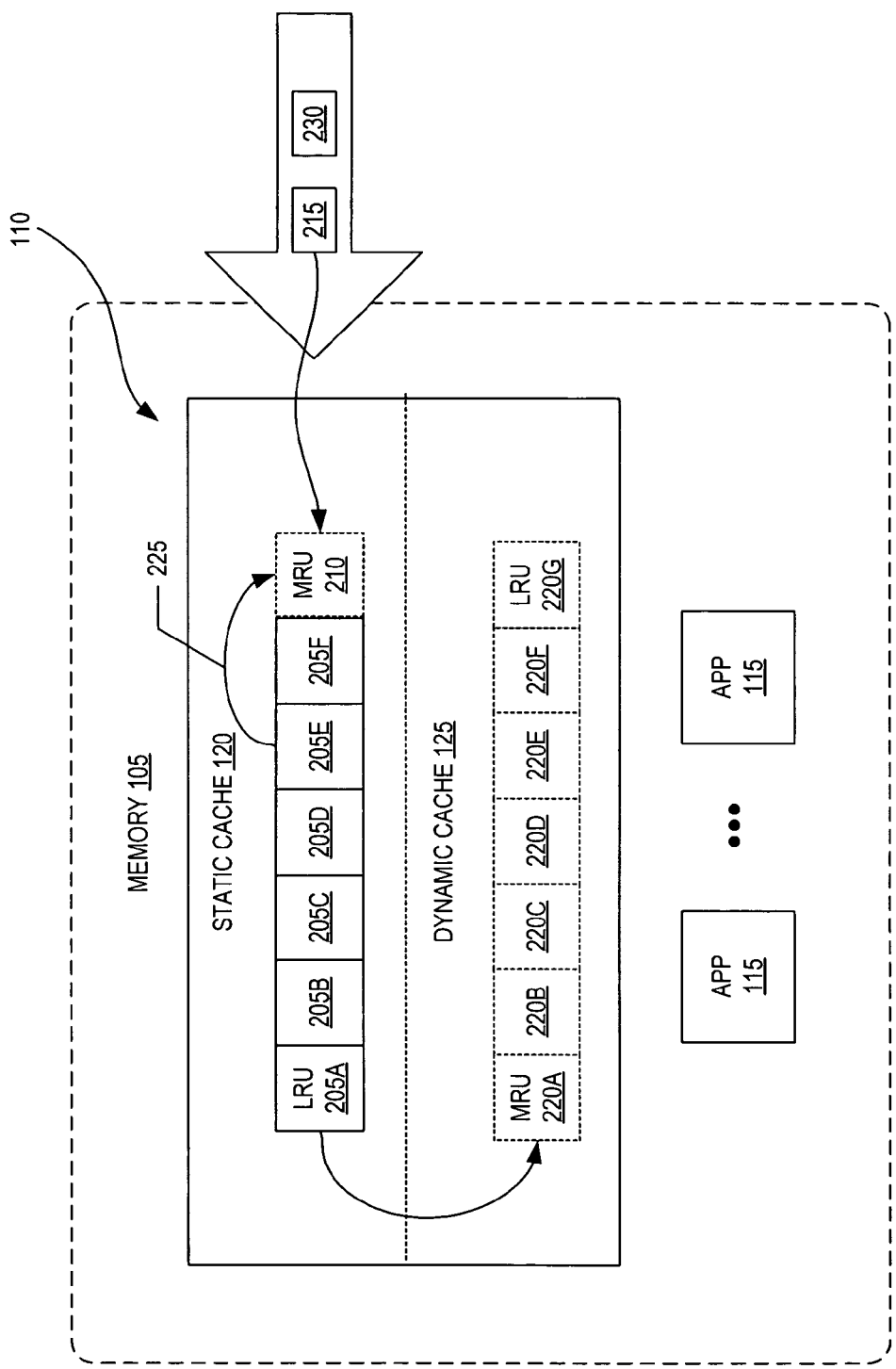
FIG. 2 is a block diagram illustrating memory including a hybrid-cache buffering data, in accordance with an embodiment of the present invention.

FIG. 2 is a block diagram illustrating memory 105 including hybrid-cache 110 caching data, in accordance with an embodiment of the present invention. When data is first cached into hybrid-cache 110, the cached data begins its life in static cache 120. As new data is cached, static cache 120 will eventually fill to capacity. Once full, portions of the cached data within static cache 120 are evicted from static cache 120 and enrolled into dynamic cache 125. In one embodiment, as data is evicted into dynamic cache 125, dynamic cache 125 will expand to accept the evicted data from static cache 120, as long as excess memory 105 is available for consumption by dynamic cache 125. Eventually, dynamic cache 125 will be unable to expand any further due to scarcity of available memory 120. At this point, dynamic cache 125 must begin evicting some of its data to accept new data evicted from static cache 120. In some embodiments, hybrid-cache 110 may include a second or multiple layers of dynamic caches (not illustrated) to accept data evicted from dynamic cache 125.

Embodiments of the present invention are capable of implementing a variety of different eviction policies for both static cache 120 and dynamic cache 125. Both static cache 120 and dynamic cache 125 may implement the same eviction policy or different evictions policies, according to the task at hand. Similarly, embodiments including multiple dynamic caches may include dynamic caches implementing the same eviction policy or different eviction policies.

Selection of the most appropriate eviction policy can dramatically affect the efficiency of hybrid-cache 110, depending upon the type of data requests received from data consumers 135. For example, requests from data consumers 135 may be completely random or have a definite trend. As such, the type of requests affect the decision of what eviction policy to implement. Some example eviction policies include, Least Recently Used ("LRU"), Most Recently Used ("MRU"), Most Frequently Used ("MFR"), First In First Out ("FIFO"), Time to Live ("TTL"), and the like. In general, no one eviction policy is best for all environments. However, LRU is a popular eviction policy where the least recently used data element within the cache is the first element evicted once the cache becomes full. Although any of the above eviction policies (or others) may be implemented in connection with embodiments of the present invention, for the sake of clarity and convenience, the present invention will be illustrated using the LRU eviction policy for both static cache 120 and dynamic cache 125.

Referring to FIG. 2, data cached within static cache 120 is called "stable data" and data cached within dynamic cache 125 is called "soft data." The data cached within static cache 120 is referred to as stable data because it is less likely to be completely evicted from hybrid-cache 110, than data cached within dynamic cache 125. The data cached within dynamic cache 125 may be said to be "softly reachable" because it is less likely to remain cached than the data cached in static cache 120. The stable data and soft data may represent any type of cacheable data, including objects of an object orientated language (e.g., Java), database files, archive files, application files, data files, and the like.

Stable data 205A-F (collectively referred to as stable data 205) is illustrated as currently cached within static cache 120. A slot 210 of static cache 120 is currently empty, but available to accept more data, such as a data 215 to be received from one of data sources 130. Since static cache 120 is not yet full, dynamic cache 125 remains empty, as illustrated by empty slots 220A-G (collectively referred to as slots 220).

Once data 215 is cached into static cache 120 as stable data, data 215 becomes the Most Recently Used ("MRU") stable data. Since stable data 205A was the last data accessed by one of data consumers 135, stable data 205A is the Least Recently Used ("LRU") stable data. Accordingly, if stable data 205E is subsequently retrieved from static cache 120 by one of data consumers 135, stable data 205E becomes the MRU stable data, as illustrated by an arrow 225. Stable data 205F and data 215 (now stable data 215) would shift left towards the LRU position within static cache 120.

When data 230 is received by static cache 120, static cache 120 is already full. Therefore, stable data 205A currently residing in the LRU position, is evicted to dynamic cache 125 and enrolled into dynamic cache 125 as soft data in the MRU position of dynamic cache 125. As more data continues to enter hybrid-cache 110, dynamic cache 125 dynamically grows with the stable data evicted from static cache 120. As slots 220A-G fill with soft data, dynamic cache 125 will eventually be unable to continue to grow due to available memory constraints within memory 105. At this point dynamic cache 125 will begin to evict portions of the soft data as described above.

Figure 3:
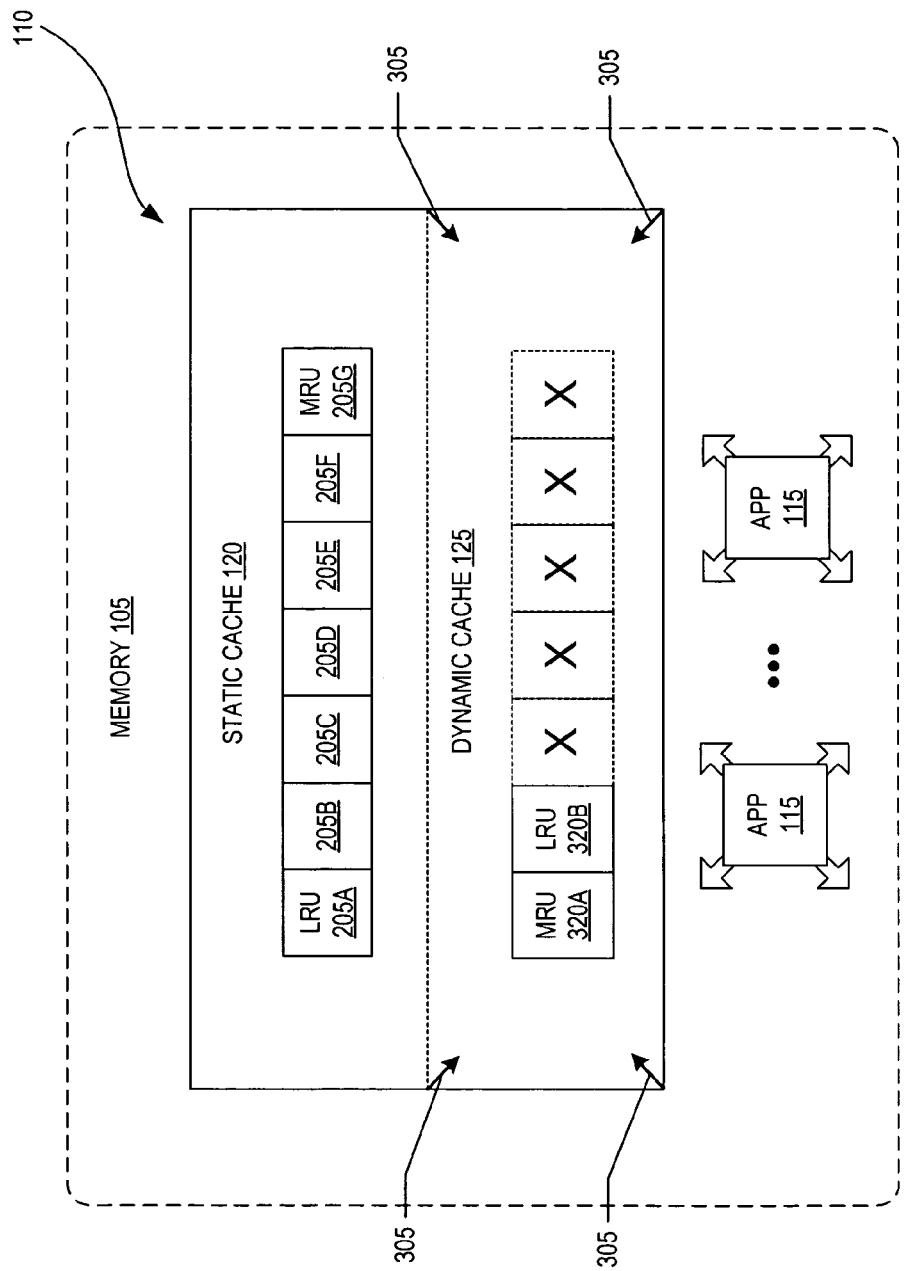
FIG. 3 is a block diagram illustrating how a dynamic cache of a hybrid-cache contracts when applications within the memory expand, in accordance with an embodiment of the present invention.

FIG. 3 is a block diagram illustrating how dynamic cache 125 contracts, in accordance with an embodiment of the present invention. When applications 115 begin to expand and consume larger portions of memory 105, available memory within memory 105 may become scarce. Applications 115 may expand due to periods of intensive processing or for a variety of other reasons. In any event, in order to free up portions of memory 115, dynamic cache 125 may need to contract.

As illustrated by arrows 305, dynamic cache 125 contracts when applications 115 expand and there is a scarcity of available memory 105. When dynamic cache 125 contracts, soft data once residing within dynamic cache 125 is evicted, as illustrated by the "X" mark within the slots. As soft data is evicted from dynamic cache 125, the LRU position migrates towards the MRU position. FIG. 3 is a snap shot illustration of dynamic cache 125 having soft data 320A and 320B, while the rest of the soft data has been evicted due to contraction of dynamic cache 125.

Figure 4:
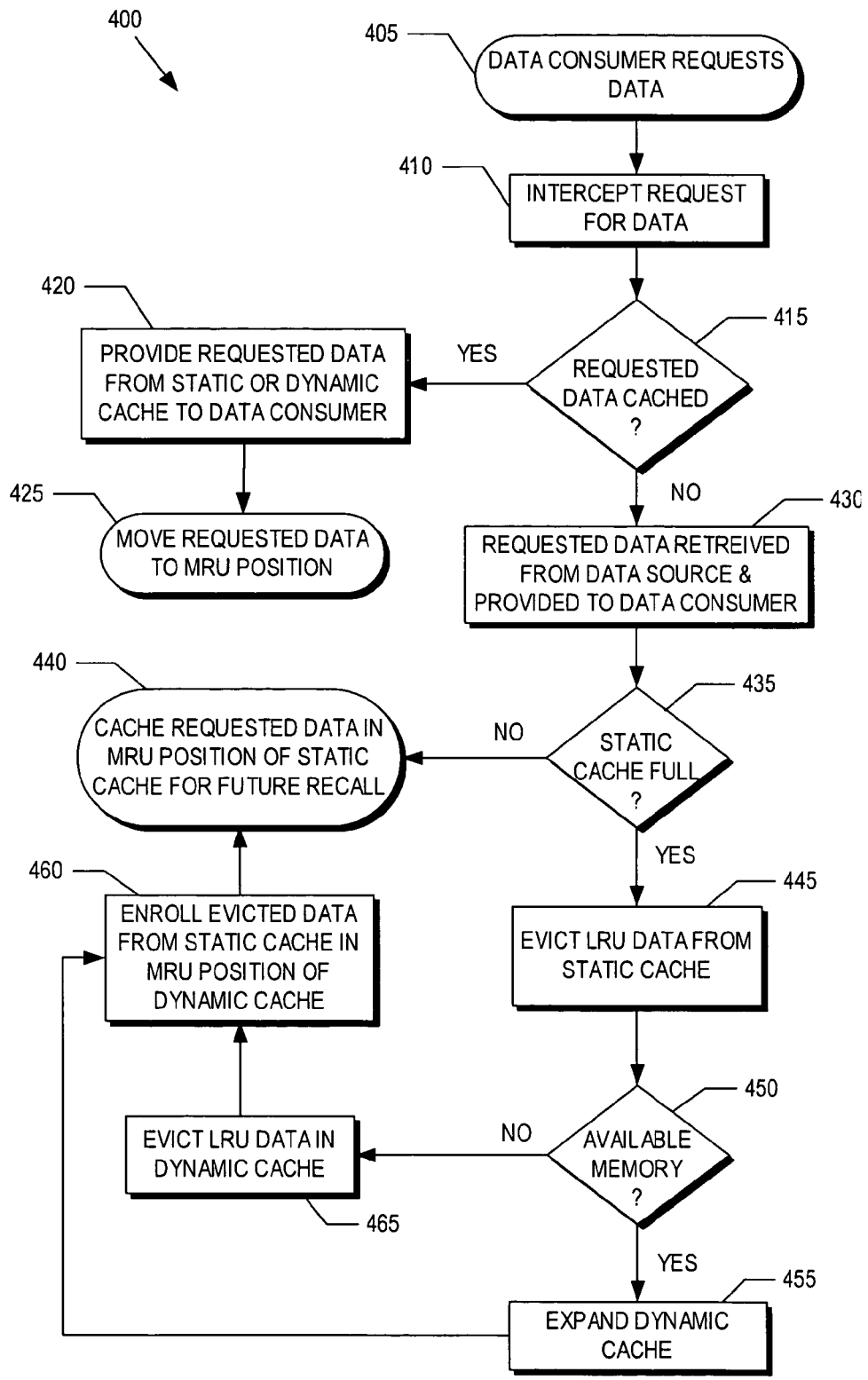
FIG. 4 is a flow chart illustrating a process for caching data within a hybrid-cache, in accordance with an embodiment of the present invention.

FIG. 4 is a flow chart illustrating a process 400 for caching data within hybrid-cache 110, in accordance with an embodiment of the present invention. In a process block 405, one of data consumers 135 requests data from one of data sources 130. In a process block 410, the request is intercepted by processing system 100. If the requested data is cached within hybrid-cache 110 (decision block 415), then process 400 continues to a process block 420.

In process block 420, since the requested data was found to be cached within one of static cache 120 or dynamic cache 125, then the requested data is served up or provided to the requestor (i.e., one of data consumers 135). In an embodiment of hybrid-cache 110 implementing the LRU eviction policy, once the requested data is served up, the requested data is further moved into the MRU position of static cache 120, in a process block 425. Thus, if there was a cache hit within dynamic cache 125, then the particular soft data is enrolled into the MRU position of static cache 120. All stable data 205 is shifted or otherwise repositioned towards the LRU position and stable data 205A currently residing in the LRU position of static cache 120 is evicted into dynamic cache 125. The evicted stable data 205A is subsequently enrolled into the MRU position of dynamic cache 125. If there was a cache hit within static cache 120, then the particular stable data is moved to the MRU position and the other stable data 205 shifted/repositioned accordingly.

Returning to decision block 415, if the requested data is not currently cached within either portion of hybrid-cache 110, then process 400 continues to a process block 430. In process block 430, the requested data is retrieved from one of data sources 130 and provided to the requester. If static cache 120 is not currently full (decision block 435), then the requested data is cached into static cache 120 for future recall (process block 440). However, if static cache 120 is full, then process 400 continues to a process block 445 to make room within static cache 120 for the newly received data.

In process block 445, stable data 205A currently residing within the LRU position of static cache 120 is evicted from static cache 120. In a decision block 450, if memory 105 contains adequate available memory to allow dynamic cache 125 to expand to accept the evicted stable data 205A, then process 400 continues to process block 455. In process block 455, dynamic cache 125 expands and in a process block 460, the evicted stable data 205A is enrolled into the MRU position of dynamic cache 125 as soft data 320A (see FIG. 3). However, if memory 105 does not contain adequate available memory to expand dynamic cache 125 (decision block 450), then the soft data currently residing in the LRU position of dynamic cache 125 is evicted from dynamic cache 125 (process block 465) prior to enrolling the evicted stable data 205A, in process block 460. Once room has been made available in stable cache 120 and the evicted stable data enrolled into dynamic cache 125, the newly received data is cached into the MRU position of static cache 120 for future recall, as described above in process block 440.

It should be appreciated that if memory 105 is so scarce that dynamic cache 125 has contracted to a point that it cannot hold any soft data 320, then process 400 may skip process blocks 465 and 460. Process 400 would not need to evict soft data from dynamic cache 125 in process block 465, since dynamic cache 125 would not contain any soft data. Furthermore, process 400 would not need to enroll data into dynamic cache 125 (process block 460), since available memory 105 is too scarce to contain any dynamic cache 125. Rather, stable data 205A currently residing within the LRU position of static cache 120 would simply be evicted from hybrid-cache 110, and therefore no longer cached.

Figure 5:
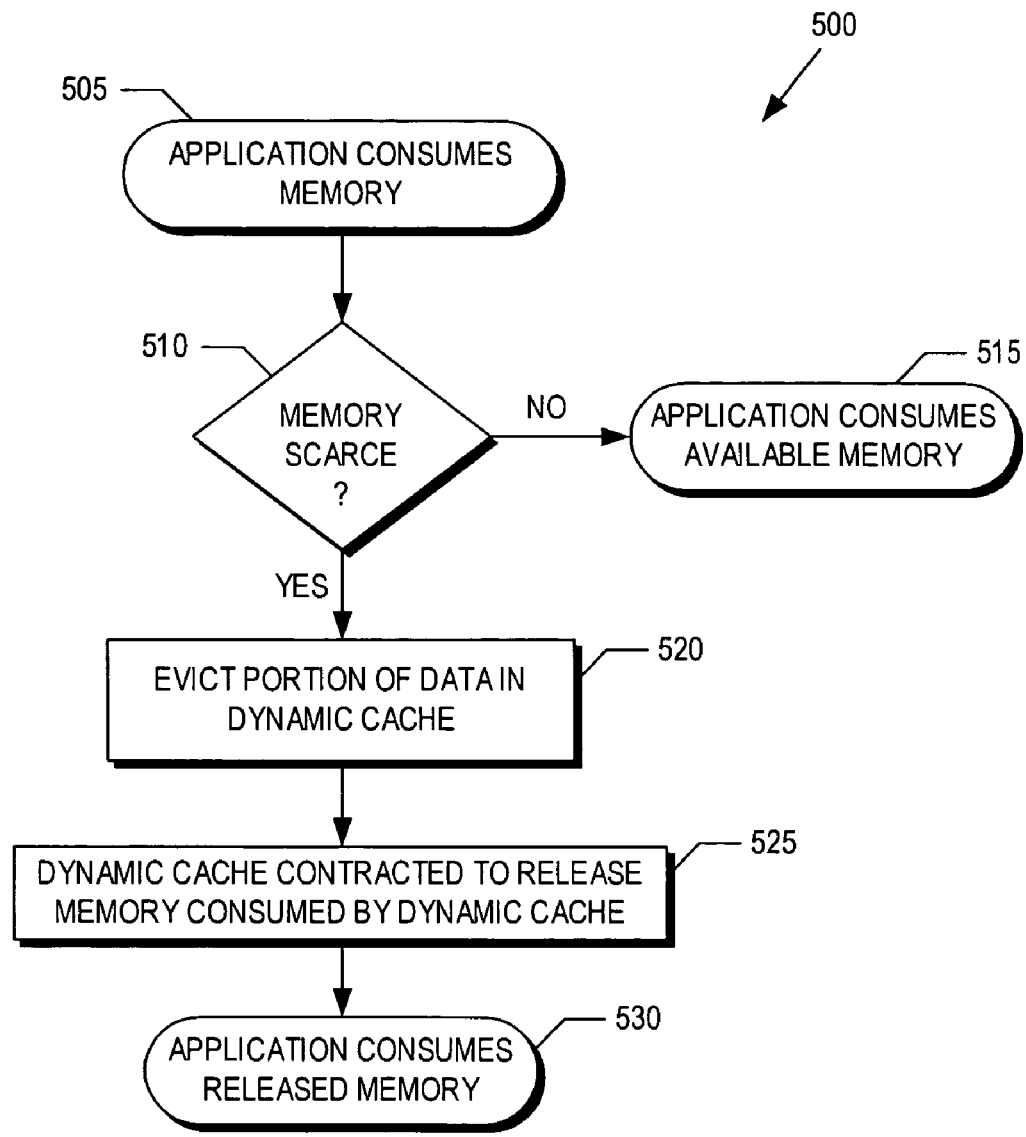
FIG. 5 is a flow chart illustrating a process for contracting a dynamic cache when memory is scarce to release memory for other uses, in accordance with an embodiment of the present invention.

FIG. 5 is a flow chart illustrating a process 500 for contracting dynamic cache 125 when available memory 105 is scarce, in accordance with an embodiment of the present invention. In a process block 505, one or more of applications 115 begin to consume greater portions of memory 105. Applications 115 may consumer greater portions of memory 105 during intensive processing periods. If available memory 105 is not scarce (e.g., memory 105 contains adequate unused or available memory for applications 115 to expand into), then applications 115 will expand into the free portions of memory 105, in process block 515. At some point, applications 115 may consume sufficient sums of memory 105, such that available memory 105 may become scarce.

If the demand for memory 105 exceeds the supply of free or available memory 105 (decision block 510), then dynamic cache 125 may need to contract to free up memory 105 for other uses, such as applications 115. Without contracting dynamic cache 125, applications 115 will not be able to expand and a stack overrun or insufficient memory error may occur, else in some embodiments, applications 115 may need to be swapped to a hard disk of processing system 100, considerably slowing executing of applications 115. In this scenario, process 500 continues to a process block 520.

In process block 520, portions of soft data 320 are evicted from dynamic cache 125. In the LRU eviction policy embodiment, the LRU soft data is evicted first. In a process block 525, dynamic cache 125 is contracted to release portions of memory 105 consumed by the recently evicted soft data. Finally, in a process block 530, one or more of applications 115 can expand into the newly released portions of memory 105.

It should be appreciated that processes 400 and 500 may occur simultaneously or execute cyclically. Thus, during runtime of processing system 100, dynamic cache 125 may be constantly expanding and contracting in a cyclical manner, according to the demand for hybrid-cache 110, the execution of applications 115, and the total size of memory 105. However, static cache 120 represents an absolute minimum size to which hybrid-cache 105 may contract during periods when available portions of memory 105 are scarce.

Figure 6:
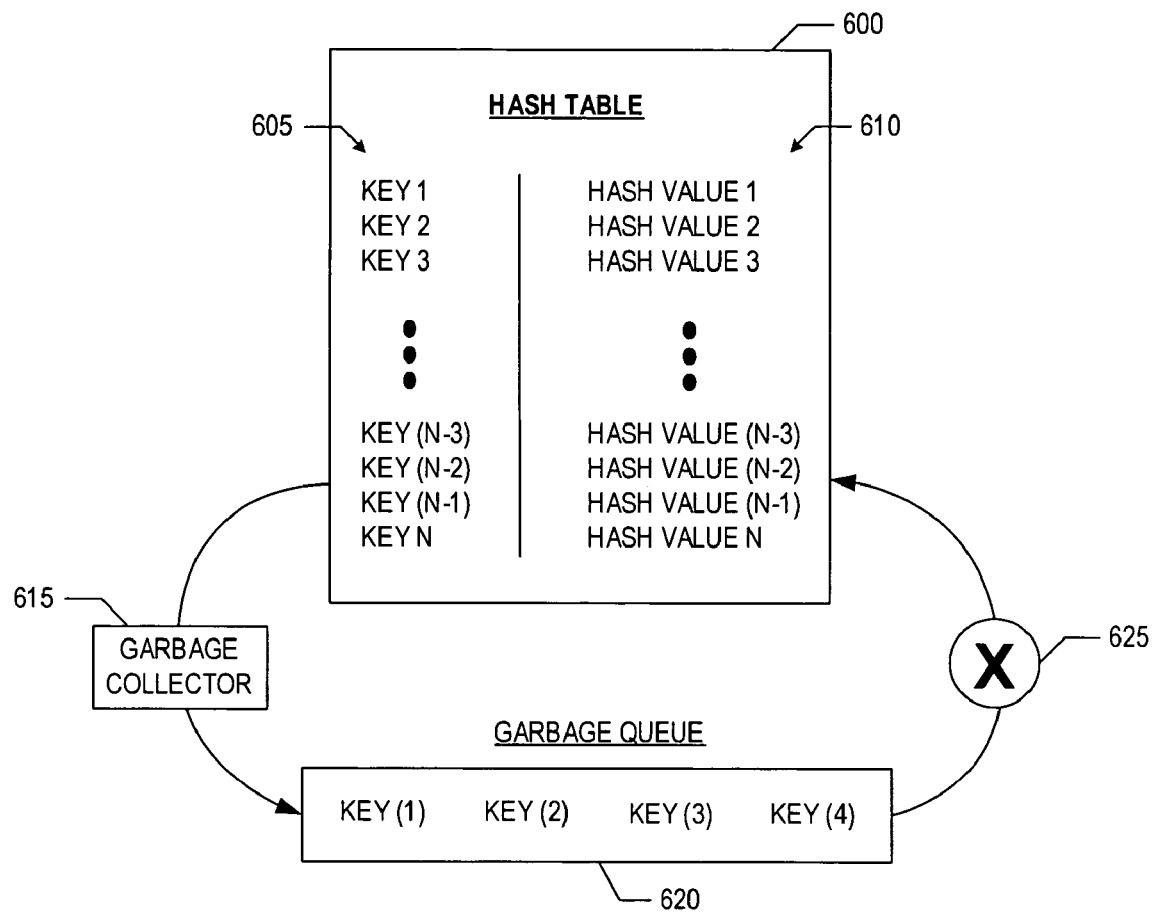
FIG. 6 is a block diagram illustrating a hash table to implement a canonical mapping scheme for buffering data within a hybrid-cache, in accordance with an embodiment of the present invention.

FIG. 6 is a block diagram illustrating a hash table 600 to implement a canonical mapping scheme for buffering data within hybrid-cache 110, in accordance with an embodiment of the present invention. A canonical mapping scheme is any mapping scheme that conforms to a general rule. Hash table 600 is one example of a canonical mapping scheme wherein keys 605 are indexed to hash values 610 (i.e., key-value pairs). Hash values 610 represent data cached within hybrid-cache 110 (e.g., stable data 205 or soft data 320). Each of keys 605 represents a sort of serial number, either alphabetic, numeric, or alphanumeric, to enable quick indexing into hash table 600 to access the corresponding one of hash values 610.

Hash tables may be used to store stable data 205 within static cache 120 or to store soft data 320 within dynamic cache 125. However, hash table 600 is particularly well suited for use with dynamic cache 125, enabling dynamic cache 125 to grow and/or contract dynamically simply by adding or deleting key-value pairs.

In one embodiment, when stable data 205 is evicted from static cache 120 and enrolled into dynamic cache 125 as soft data 320, a key-value pair associated with the evicted stable data 205 is moved from the static portion to the dynamic portion of hybrid-cache 110. In an embodiment where hash table 600 provides a canonical mapping scheme for dynamic cache 125, the key-value pair is cached into dynamic cache 125, by adding the key-value pair to hash table 600. To contract dynamic cache 125, a garbage collector 615 (e.g., the Java Garbage Collector), copies a particular one of keys 605, associated with a hash value designated for eviction from dynamic cache 125, into a garbage queue 620. Garbage collector 615 may simultaneously copy multiple keys 605 into garbage queue 620 as is needed to free up sufficient memory 105 for applications 115.

Subsequently, a garbage thread 625, uses the keys copied into garbage queue 620 to delete the corresponding hash values 610 from hash table 600. In one embodiment, each time one of keys 605 is copied into garbage queue 620, garbage thread 625 is notified. Garbage collector 615 may copy keys 605 into garbage queue 620 accordingly to an eviction policy, such as the LRU eviction policy. Using the techniques described herein, objects designated for garbage collection by garbage collector 615 are cleared from hash table 600 in constant time, not dependent upon the number of key-value pairs currently cached within hash table 600. In contrast, prior art techniques suffer from a linearly increasing time to clear cached objects dependent upon the total number of objects cached.

Figure 7:
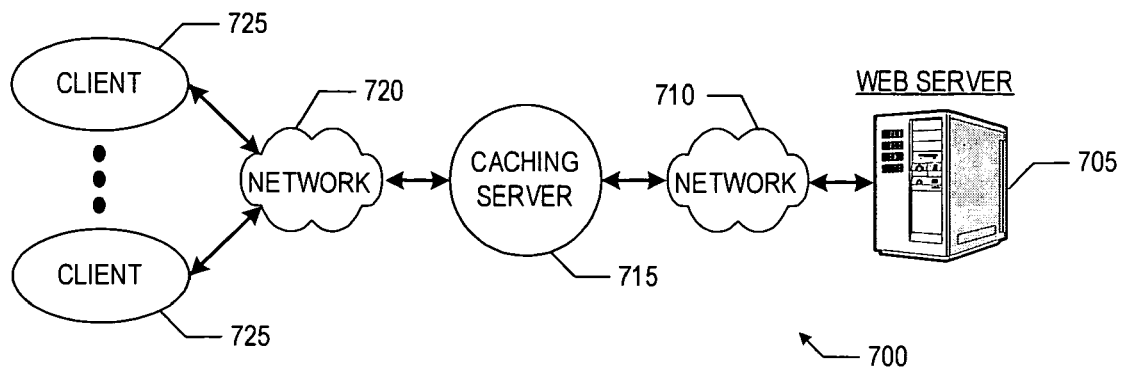
FIG. 7 illustrates a system including a caching server for implementing a hybrid-cache, in accordance with an embodiment of the present invention.

FIG. 7 illustrates a system 700 including a caching server for utilizing hybrid-cache 110, in accordance with the teachings described herein. The illustrated embodiment of system 700 includes a web server 705 coupled to a network 710 (e.g., the Internet), coupled to a caching server 715, coupled to a network 720 (e.g., LAN, WAN, etc.), which is in turn coupled to one or more clients 725.

System 700 represents one possible implementation of FIG. 1, wherein web server 705 corresponds to one of data sources 130, caching server 715 corresponds to processing system 100, and clients 725 correspond to data consumers 135. Web server 705 may be located a great distance from caching server 715, while clients 725 may be located within the same building as caching server 715. In one embodiment, caching server 715 may provide a portal to the Internet, through which clients 725 must communicate to gain access to the Internet. In one embodiment, caching server 715 may further act as a firewall to protect clients 725 from malicious activity inbound from network 710.

In one embodiment, caching server 715 utilizes hybrid-cache 110 to accelerate access to web server 705. When a first one of clients 725 requests a web page from web server 705, caching server 715 can locally cache a copy of the web page within hybrid-cache 110. Subsequently, when another one of clients 725 requests the same web page, caching server 715 can quickly provide the web page without having to re-download the web page from web server 705. In one embodiment, hybrid-cache 110 is maintained on a hard disk of caching server 715. In this embodiment, memory 105 is the hard disk.

Figure 8:
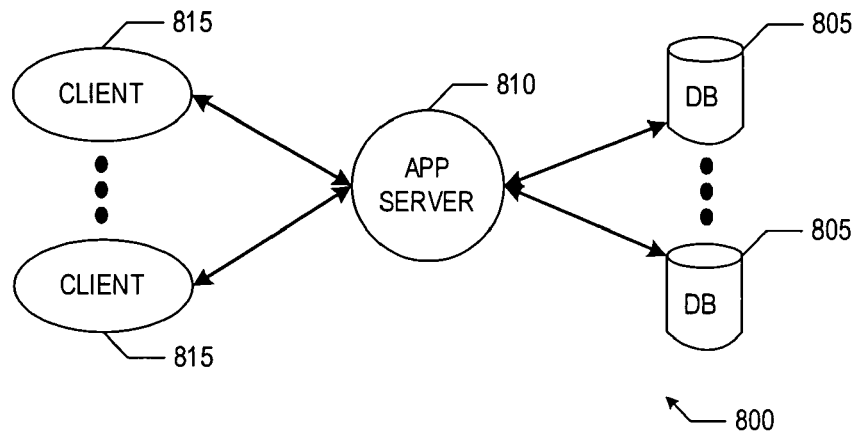
FIG. 8 illustrates a system including an application server for utilizing a hybrid-cache, in accordance with an embodiment of the present invention.

FIG. 8 illustrates a system 800 including an application server for implementing hybrid-cache 110, in accordance with an embodiment of the present invention. The illustrated embodiment of system 800 includes one or more databases 805 communicatively coupled to an application server 810, which in turn is communicatively coupled to one or more clients 815. Application server 810 may represent a portion of an enterprise system, such as a server node of a distributed Web Application Server (e.g., Java based WebAS, a .NET framework, or the like).

System 800 represents one possible implementation of FIG. 1, wherein databases 805 correspond to sources 130, application server 810 corresponds to processing system 100, and clients 815 correspond to data consumers 135. In one embodiment, clients 815 issue database access statements to application server 810. In turn, application server 810 compiles the database access statements to interrogate one or more of databases 805. The results of the interrogation are prepared and/or graphically formatted by application server 810 before providing the results to the requesting one of clients 815. Application server 810 may cache the prepared results within an instance of hybrid-cache 110 internal to application server 810. Thus, if one of clients 815 subsequently issues an identical database access statement, application server 810 can quickly provide the results without need to interrogate databases 805 or re-prepare/format the results.

In one embodiment, databases 805 are relational database management systems ("RDBMS") and the database access statements are issued by the clients 815 using a Structured Query Language ("SQL"). In one embodiment, the database access statements are issued by Java applications or applets executing on clients 815.

Figure 9:
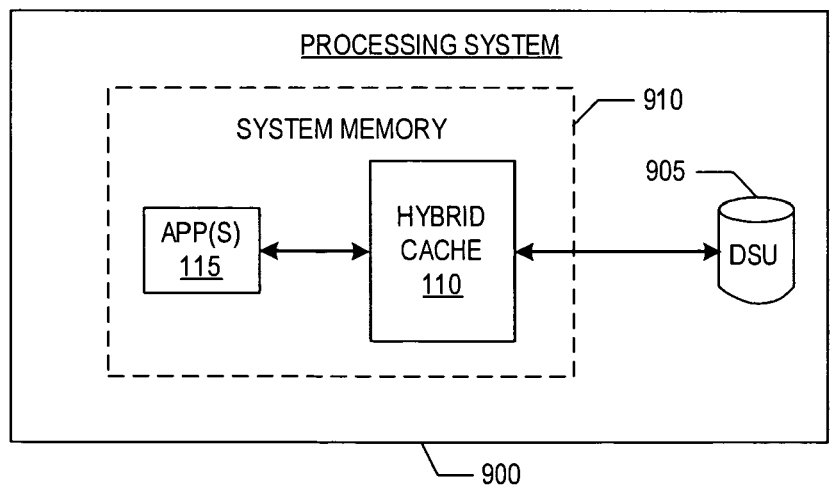
FIG. 9 illustrates a processing system for utilizing a hybrid-cache within system memory, in accordance with an embodiment of the present invention.

FIG. 9 illustrates a processing system 900 for implementing hybrid-cache 110 within system memory, in accordance with an embodiment of the present invention. The illustrated embodiment of processing system 900 includes a data storage unit ("DSU") 905 and system memory 910 storing an instance of hybrid-cache 110 and applications 115. In one embodiment, system memory 910 is volatile random access memory. In one embodiment, DSU 905 is a hard disk drive. Hybrid-cache 110 is implemented within system memory 910 to effectively cache data and applications within system memory 910 so as to reduce the need to swap the data and/or applications to virtual memory within DSU 905.

Figure 10:
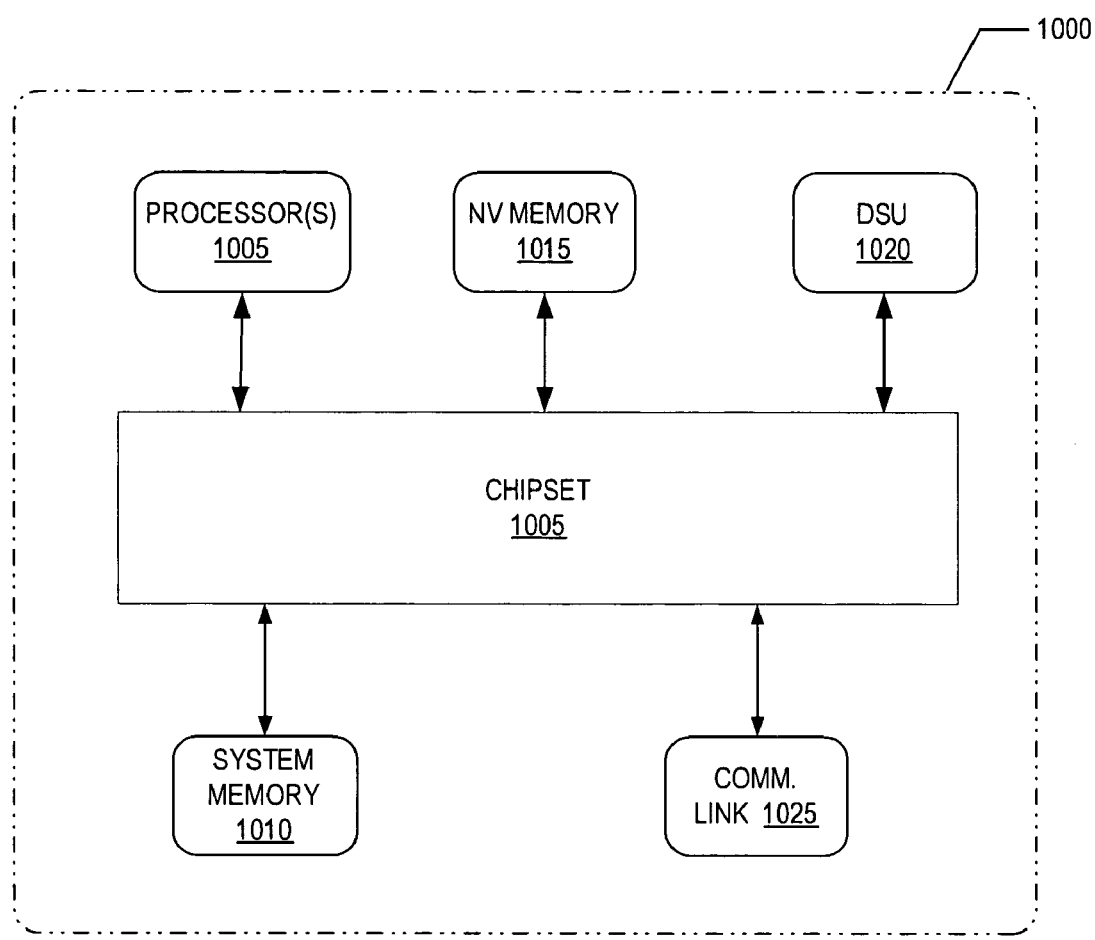
FIG. 10 is a block diagram illustrating a demonstrative processing system for implementing embodiments of the present invention.

FIG. 10 is a block diagram illustrating a demonstrative processing system 1000 for implementing processing system 100 and the various embodiments of FIGS. 7-9, according to the techniques described herein. The illustrated embodiment of processing system 1000 includes one or more processors (or central processing units) 1005, system memory 1010, nonvolatile ("NV") memory 1015, a data storage unit ("DSU") 1020, a communication interface 1025, and a chipset 1030. The illustrated processing system 1000 may represent any computing system including a client computer, a desktop computer, a notebook computer, a workstation, a handheld computer, a server, a blade server, a database, and the like.

The elements of processing system 1000 are interconnected as follows. Processor(s) 1005 is communicatively coupled to system memory 1010, NV memory 1015, DSU 1020, and communication interface 1025, via chipset 1030 to send and to receive instructions or data thereto/therefrom. In one embodiment, NV memory 1015 is a flash memory device. In other embodiments, NV memory 1015 includes any one of read only memory ("ROM"), programmable ROM, erasable programmable ROM, electrically erasable programmable ROM, or the like. In one embodiment, system memory 1010 includes random access memory ("RAM"). DSU 1020 represents any storage device for software data, applications, and/or operating systems, but will most typically be a nonvolatile storage device. DSU 1020 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1020 is illustrated as internal to processing system 1000, DSU 1020 may be externally coupled to processing system 1000. Communication interface 1025 may couple processing system 1000 to a network (e.g., network 710 or 720) such that processing system 1000 may communicate over the network with one or more other machines (e.g., data sources 130 and data consumers 135). Communication interface 1025 may include a modem, an Ethernet card, Universal Serial Bus ("USB") port, a wireless network interface card, or the like.

It should be appreciated that various other elements of processing system 1000 have been excluded from FIG. 10 and this discussion for the purposes of clarity. For example, processing system 1000 may further include a graphics card, additional DSUs, other persistent data storage devices (e.g., tape drive), and the like. Chipset 1030 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1030. Correspondingly, processing system 1000 may operate without one or more of the elements illustrated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A caching method, comprising:
    caching data received from a data source within a static cache as stable data, the static cache having a fixed size;
    evicting a portion of the stable data within the static cache to a dynamic cache when the static cache reaches a threshold fill level; and
    enrolling the evicted portion of the stable data into the dynamic cache as soft data, the dynamic cache having a dynamically changing size according to availability of memory, where soft data is evicted from the dynamic cache prior to evicting stable data from the static cache if availability of memory is scarce.

2. The caching method of claim 1, wherein evicting the portion of the stable data further comprises evicting the portion of the stable data to the dynamic cache according to a Least Recently Used eviction policy.

3. The caching method of claim 1, further comprising:
    evicting selectively at least some of the soft data from the dynamic cache when the availability of the memory is scarce; and
    contracting the dynamic cache to release some of the memory consumed by the dynamic cache.

4. The caching method of claim 3, wherein evicting selectively the at least some of the soft data further comprises evicting the at least some of the soft data according to a Least Recently Used eviction policy.

5. The caching method of claim 3, wherein enrolling the evicted portion of the stable data into the dynamic cache as soft data comprises caching the soft data as hash values of a hash table, the hash values being indexed to keys for accessing the hash values.

6. The caching method of claim 5, wherein evicting selectively at least some of the soft data from the dynamic cache comprises:
    copying at least some of the keys into a garbage queue, the at least some of the keys corresponding to the at least some of the soft data; and
    removing at least some of the hash values from the hash table based on the at least some of the keys in the garbage queue.

7. The caching method of claim 6, wherein a Java Garbage Collector selectively copies the at least some of the keys into the garbage queue.

8. The caching method of claim 2, wherein the data comprises first data, the method further comprising:
    intercepting a request for second data from the data source;
    determining whether the second data is cached within either of the static cache and dynamic cache; and providing the second data from either of the static cache and the dynamic cache instead of the data source, if the determining determines that the second data is cached.

9. The caching method of claim 8, further comprising moving the second data to a most recently used position within the static cache, upon determining that the second data is cached.

10. The caching method of claim 2, wherein the static cache and the dynamic cache comprise a hybrid-cache within a single memory device.

11. The caching method of claim 2, wherein the stable data and the soft data comprise objects of an object orientated language.

12. The caching method of claim 1, wherein the threshold fill level comprises a full static cache.

13. An article of manufacture comprising a machine-accessible medium having instructions stored thereon that, if executed by a machine, will cause the machine to perform operations comprising:
    caching first data received from a data source into a hybrid-cache, the hybrid-cache including a static cache having a fixed size and a dynamic cache having a dynamically changing size;
    enrolling the first data received from a data source into the static cache as stable data;
    evicting selective portions of the stable data within the static cache to the dynamic cache when the static cache is full; and
    enrolling the selective portions of the stable data evicted from the static cache into the dynamic cache as soft data, the dynamic cache having a dynamically changing size according to availability of memory, where soft data is evicted from the dynamic cache prior to evicting stable data from the static cache if availability of memory is scarce.

14. The article of manufacture of claim 13, further providing instructions that, if executed by the machine, will cause the machine to perform further operations, comprising:
    expanding the dynamic cache to accommodate the selective portions of the stable data evicted to the dynamic cache, if adequate memory is available; and
    evicting at least some of the soft data from the dynamic cache to accommodate the selective portions of the stable data evicted to the dynamic cache, if adequate memory is not available.

15. The article of manufacture of claim 14, further providing instructions that, if executed by the machine, will cause the machine to perform further operations, comprising:
    contracting the dynamic cache to release some of the memory consumed by the dynamic cache, if the memory is scarce.

16. The article of manufacture of claim 14, wherein enrolling the selective portions of the stable data evicted from the static cache into the dynamic cache as the soft data comprises caching the soft data within the dynamic cache according to a canonical mapping scheme.

17. The article of manufacture of claim 16, wherein caching the soft data within the dynamic cache according to the canonical mapping scheme comprises caching the soft data as a hash value of a hash table, the hash values being indexed to keys for accessing the hash values.

18. The article of manufacture of claim 17, wherein evicting the at least some of the soft data from the dynamic cache comprises:
    copying at least some of the keys into a garbage queue, the at least some of the keys corresponding to the at least some of the soft data; and
    removing at least some of the hash values from the hash table based on the at least some of the keys in the garbage queue.

19. The article of manufacture of claim 13, wherein evicting selective portions of the stable data within the static cache comprises evicting the selective portions of the stable data according to a Least Recently Used eviction policy.

20. The article of manufacture of claim 13, wherein the stable data and the soft data comprise objects of an object orientated language.

21. A system, comprising:
    a processor to process requests for data from a data source; and
    a memory device communicatively coupled to the processor, the memory device to hold a hybrid-cache, the hybrid-cache comprising:
    a static cache for caching the data as stable data, the static cache having a fixed size; and
    a dynamic cache having a dynamically changing size according to availability of memory within the memory device, wherein portions of the stable data within the static cache are to be evicted to the dynamic cache as soft data when the static cache is full, wherein the dynamic cache is to expand to accommodate the portions of the stable data evicted to the dynamic cache when the static cache is full, if adequate memory is available within the memory device, and wherein the dynamic cache is further to evict at least some of the soft data from the dynamic cache to accommodate the portions of the stable data evicted to the dynamic cache, if adequate memory is not available within the memory device, where soft data is evicted from the dynamic cache prior to evicting stable data from the static cache if availability of memory is scarce.

22. The system of claim 21, wherein the dynamic cache is further to contract to release memory consumed by the dynamic cache, if other entities within the memory device expand.

23. The system of claim 21, wherein the memory device comprises Random Access Memory ("RAM") and wherein the data source comprises a data storage device communicatively coupled to the processor, the hybrid-cache to reduce swapping to the data storage device.

24. The system of claim 21, wherein the system comprises a caching server, wherein the requests for the data from the data source comprise requests from clients of the caching server, and wherein the data source comprises an Internet.

25. The system of claim 21, wherein the system comprises an Application Server, wherein the requests for the data from the data source comprise requests from clients of the Application Server, and wherein the data source comprises at least one database.

26. The system of claim 21, wherein the Application Server comprises one of a Java based Application Server and a .NET based Application Server.

27. A system, comprising:
    static means for caching stable data received from a data source within a fixed amount of memory;
    first means for selectively evicting portions of the stable data from the static means when the static means is full;
    dynamic means for caching soft data within a dynamically changing amount of memory;

second means for evicting the soft data from the dynamic means when the available amount of memory is scarce; and means for enrolling the portions of the stable data evicted by the means for evicting into the dynamic means as the soft data, for caching the soft data within the dynamically changing amount of the memory based on an available amount of the memory, and for contracting the dynamically changing amount of memory when the available amount of memory is scarce, the dynamic means having a dynamically changing size according to availability of memory, where soft data is evicted from the dynamic means prior to evicting stable data from the static means if availability of memory is scarce.

* * * * *